United States Patent [19]

Taylor, Jr.

[11] Patent Number: 5,069,532

[45] Date of Patent: Dec. 3, 1991

[54] PIXEL ADDRESSING IN A FERROELECTRIC LIQUID CRYSTAL ARRAY

[75] Inventor: David F. Taylor, Jr., Elsinore, Calif.

[73] Assignee: OCA Applied Optics, Inc., Garden Grove, Calif.

[21] Appl. No.: 426,256

[22] Filed: Nov. 20, 1989

[51] Int. Cl.[5] .................................... G02F 1/13

[52] U.S. Cl. .................................... 359/56

[58] Field of Search .................... 350/332, 333, 350 S

[56] References Cited

U.S. PATENT DOCUMENTS 4,447,131 5/1984 Soma .................................... 350/333

4,548,476 10/1985 Kaneko .................................. 350/333

*Primary Examiner*—Andrew J. James

*Assistant Examiner*—Courtney A. Bowers

*Attorney, Agent, or Firm*—Joseph R. Dwyer

[57] ABSTRACT

Disclosed are a method and apparatus for addressing a ferroelectric liquid crystal array where pixels are formed at the intersections of columns and rows of electrodes wherein one embodiment of a column write pulse sequence comprises four pulses- one a threshold pulse, two sub-threshold pulses and one zero pulse- all of equal width and within one unit at a time. In another embodiment a column write pulse sequence comprises five pulses- one a threshold pulse, three sub-threshold pulses and one zero pulse, with the threshold and zero pulses having equal widths and the three sub-threshold pulses having equal widths which is twice the width of the threshold pulses. In both embodiments, the same sequence of write pulses are used as row pulses but delayed or advanced to create electric fields of different directions to write a +1 or a −1 pixel depending upon whether or not the row pulse sequence is advanced or delayed. Also disclosed are non-writing pulse sequences to be addressed where a threshold field is undesirable.

10 Claims, 7 Drawing Sheets

PIXEL ADDRESSING IN A FERROELECTRIC LIQUID CRYSTAL ARRAY

BACKGROUND OF THE INVENTION

1. Field of Invention

This invention relates to ferroelectric liquid crystal spatial light modulation and specifically to a method and apparatus for addressing pixels in a ferroelectric liquid crystal array.

2. Prior Art

1. S. T. Lagerwall, J. Wahl and N. A. Clark, 1985 International Display Research Conference-Ferroelectric Liquid Crystals for Displays, 1985 IEEE.

2. U.S. Pat. No. 4,367,924 to Clark et al entitled "Chiral Smectic C or H Liquid Crystal Electro-Optical Device".

3. U.S. Pat. No. 4,563,059 to Clark et al entitled "Surface Stabilized Ferroelectric Liquid Crystal Devices".

A ferroelectric liquid crystal spatial light modulator is a bistable device which can be switched between two stable states representing two different orientations of the optical axis of the ferroelectric liquid crystal confined between two spaced apart transparent windows or electrodes. Control of the orientation of the optical axis is affected by applying a strong electric field across the liquid crystal volume perpendicular to the electrodes. A positive electric field created by a positive voltage pulse selects one orientation of the optical axis while a negative electric field created by a negative voltage pulse will select the other orientation.

The bistable nature of the ferroelectric liquid crystal lends itself to the formation of an array device formed of columns and rows of spaced apart electrodes with a switchable cell, which makes up a pixel, of ferroelectric liquid crystals formed at each intersection of the columns and rows. The voltage pulse applied to each pixel to switch the state of the pixel is called a write pulse. The threshold characteristics of the liquid crystal determines the magnitude and duration of the voltage pulse that must be applied to switch the state of the optical axis of each pixel.

To protect against detrimental electrolytic effects which occur as a consequence of having a long term DC component applied to the device, it is necessary to apply a series of under threshold opposite polarity voltage pulses to the device before or after or both before and after the write pulse. This has the effect of zeroing the average DC voltage component across the cell and thereby avoids the detrimental electrolytic effects. The price paid for this is that the total time needed to write is about 4–5 times the basic write time. That is, the device can be operated at only about ¼th to 1/5th of the speed that would be indicated by the optical rise time. It is therefore of great importance to carefully design the write and the DC zeroing pulse sequences.

Lagerwall et al, ref 1, describe a scheme for writing a column of pixels, however, the pulse sequences they suggest are complex and can write only one type of pixel (+1 or −1) with each column access. Thus, two column-write cycles are needed to write a spatial sequence or column of +1 or −1 states. In addition, their scheme requires that any pixel that is already in its desired state, must be toggled into the opposite state and then toggled back into its original state during the write cycle. All of these are undesirable properties. A scheme for writing a column of pixels that does not have these undesirable properties is needed.

SUMMARY OF THE INVENTION

The method and apparatus which fullfills the foregoing need comprises a set of pulses which will 1) write a column of pixels as a spatial sequence of +1 and −1 states in only one column access, 2) maintain a zero average voltage over each column write cycle, 3) provide a high degree of symmetry, and 4) satisfy the separation requirements of a ferroelectric liquid crystal device.

In one embodiment, column write pulse sequences comprises four pulses one threshold pulse, two sub-threshold pulses, and one zero pulse, all within a unit of time. The row write pulses are of the same type but advanced or delayed. All of the pulses of this embodiment are of the same width.

In another embodiment, the column write pulses comprises one threshold pulse, three sub-threshold pulses and one zero pulse. The row write pulses are of the same type but advanced or delayed.

In this second embodiment, the threshold pulse and the zero pulse are of the same width and the three sub-threshold pulses are each twice the width of the threshold pulse.

It will be apparent to those skilled in the art from the following drawings and Detailed Description that this method and apparatus takes advantage of the threshold properties of the ferroelectric liquid crystal, greatly increases the access speed of the ferroelectric array device by at least the factor of two, and eliminates the toggling necessary in the prior art device.

DETAILED DESCRIPTION

A. The Addressing Scheme

Figure 1:
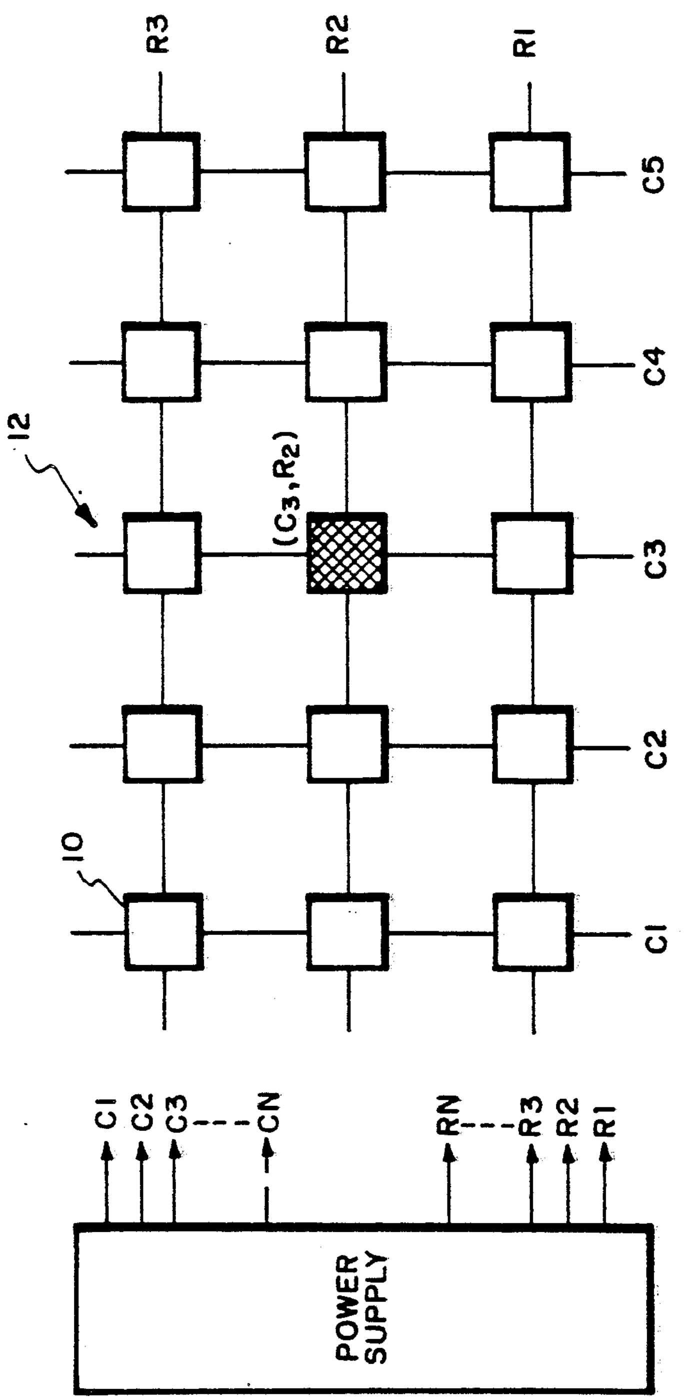
FIG. 1 shows an array comprising rows and columns of electrodes with pixels at each intersection.

The addressing scheme is shown schematically in FIG. 1. In this figure, the pixels, all denoted as 10 and shown as squares, are arranged upon a square grid (array) 12 formed of rows and columns of electrodes with assigned names R1,R2, . . . to the rows and names C1,C2, . . . to the columns of the grid. Each pixel is associated with a unique pair of names, the name Ci associated with the column the pixel lies in, and the name Ri assocated with the row the pixel lies in. As an example, the pixel in FIG. 1 which is crosshatched, can be denoted by its (column,row) pair (C3,R2). Also shown is a suitable power supply for addressing the array.

Figure 1A:
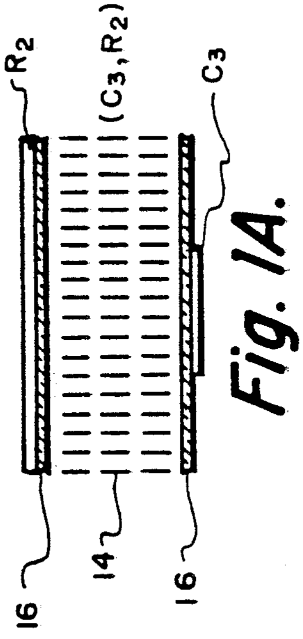
FIG. 1A is a cross-sectional view of one pixel of the array of FIG. 1.

FIG. 1A shows an example of a pixel such as the cross-hatched pixel of FIG. 1 with the ferroelectric liquid crystal 14 and its aligned molecules together with plates 16 of a suitable material such as glass. As shown, the row electrode R2 is shown on top of one of the plates, and the column electrode C3 is shown on the bottom of the other plate.

All pixels in a column will be written during the same write cycle, called the "column write cycle", and the act of writing such a column of pixels will be referred to as "accessing" the column. Thus, during the column C3 write cycle, all pixels which are located at the intersection of column C3 with the rows of the grid will be written.

B. The Write Pulse Sequence

The voltage waveform that must appear across a given pixel in order to write that pixel, must not only write the pixel into the +1 or −1 state, it must also average to zero over the write cycle time. The requirement for a zero average is imposed upon the waveform by the need to avoid undesirable electrolytic effects in the liquid crystal. Such a voltage waveform will be called the "write pulse sequence". To accomplish both of these tasks, the write pulse sequence will take advantage of the threshold properties of the ferroelectric liquid crystal cell which makes up the pixel.

At the field levels which the device is operated, the properties of the ferroelectric liquid crystal cell give rise to a threshold behavior in the form of a minimum voltage x time product for the pulse, above which the pixel state will be stabily changed and below which it will not. Thus, when a pulse with a voltage × time product that is greater than this threshold value is applied to the pixel, it will permanently change the state of the pixel, but when a pulse with a voltage × time produce that is less than this threshold is applied to the pixel, it will be unable to permanently change the state of the pixel which will remain in its original state. Above threshold pulses will be used to write the state of the pixel, while sub-threshold pulses will be used to average the waveform to zero during the write cycle.

The write pulse sequence is the voltage waveform which appears across a pixel during the write cycle and it will consist of:

1. "A Write pulse": A single pulse with sufficient amplitude and duration to exceed the threshold and;
2. "Zeroing pulses": A series of sub-threshold pulses (with polarity opposite to the polarity of the write pulse), to average the voltage to zero.

Figure 2:
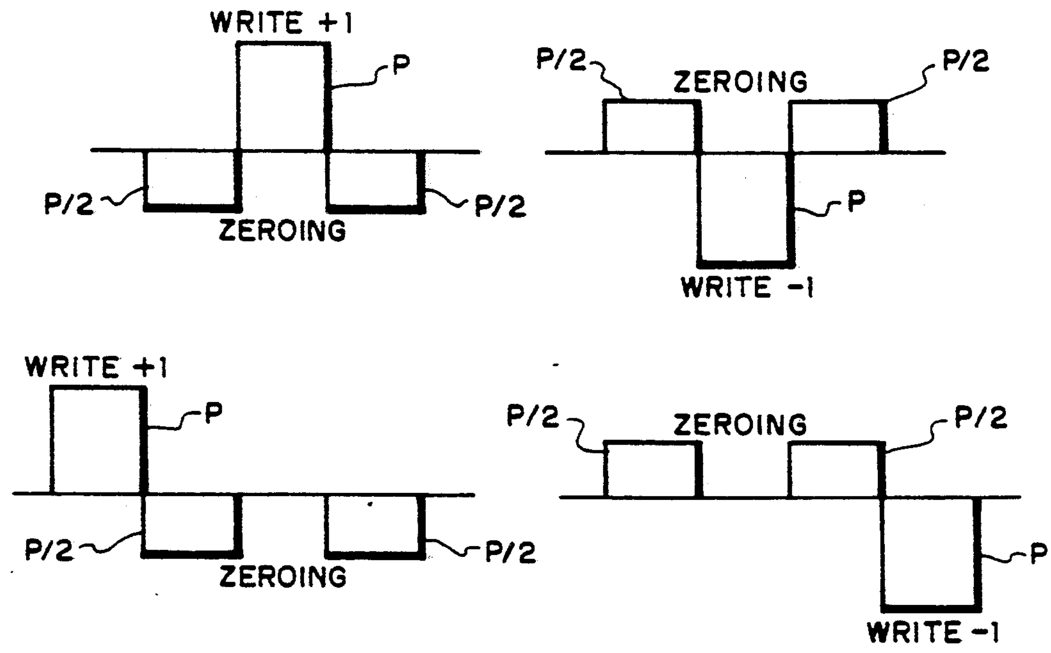
FIG. 2 shows several examples of write cycle waveforms with a write pulse and zeroing pulses.

FIG. 2 schematically represents several different examples of write pulse sequences. Notice that in each case there is one large pulse P of one polarity and several smaller pulses P/2 of the opposite polarity so that the average is zero.

In order to write two different states, such as one pixel as +1 and another as −1, will require that there be two different write pulse sequences. One of these will have a positive write pulse with negative zeroing pulses, while the other will have a negative write pulse with positive zeroing pulses.

Figure 3:
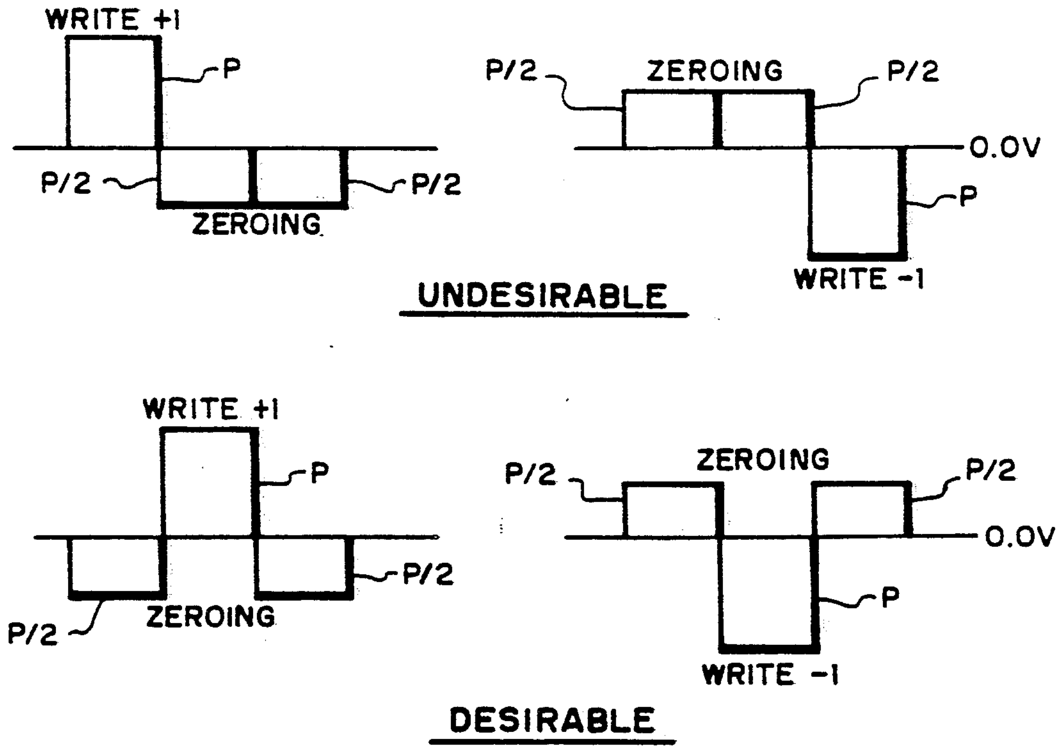
FIG. 3 shows examples of a three-pulse sequences to illustrate the separation requirement of the write pulses.

When using the write pulse sequences in ferroelectric liquid crystal devices, there are a number of characteristics of these sequences which are desirable and others which are undesirable. Key among these is the need to keep the zeroing pulses separated, that is, two zeroing pulses should not be back to back, because then their combined voltage—time product could be too large and cause the pixel to change state. FIG. 3 shows a write pulse sequence with an undesirable unseparated pair of zeroing pulses and another more desirable write pulse sequence in which the zeroing pulses are separated.

C. Creating the Write Pulse Sequence

The write pulse sequences described above represent the voltage that must appear across a pixel in order to write the pixel properly. It is not necessarily the actual voltage waveform that is applied to the row and/or column electrodes which define the pixel to be written. Rather, the voltage which appears across the pixel is the difference between the voltage applied to the column of the pixel and the voltage applied to the row of the pixel. Thus, the write pulse sequence for a given pixel is the difference of the column pulse sequence and the row pulse sequence. The write pulse sequence is denoted by W(t), and the column and row pulse sequences by A(t) and B(t), respectively, then $$W(t)=A(t)-B(t). \quad 1$$

It is clear, therefore, that the write pulse sequence must be created from the individual row and column sequences. It is these sequences, the row and column sequences, which must be synthesized so that their difference is the desired write pulse sequence. This synthesis will be affected by a number of things, including among others:

1. the availability of a bipolar power supply of the appropriate size;
2. the desire for minimum complexity.

The impact of these and other constraints upon the synthesis of column and row pulse sequences is a subject of the discussion hereinafter.

D. The Synthesis of Row and Column Sequences

D1. Bipolar Row & Column Sequences

The first basic classification of column and row pulse sequences is whether or not they will be bipolar or unipolar. Clearly, if they can be bipolar then the problem is almost trivial, for by grounding the column of a pixel and placing the write pulse sequence W(t) itself on the row of the pixel, the pixel can be appropriately written easily. In this case the column A(t) and row B(t) pulse sequences become:

$$A(t)=0$$

$$B(t)=W(t). \quad 2$$

This almost trivial case will be of use when other considerations allow a bipolar power supply to be used.

D2. Unipolar Row & Column Sequences

It is frequently the case that other considerations necessitate the use of a unipolar power supply. Under these conditions, the row and column pulse sequences must be all of one polarity and their synthesis becomes more interesting than the simple bipolar case. Before considering this synthesis in particular, some of the characteristics of the row and column sequences must be considered.

The write pulse sequence is the difference of the column pulse sequence and the row pulse sequence. Let W+(t) and W−(t) be the write pulse sequences for a write +1 and a write −1 respectively. Furthermore, let A(t) be the column pulse sequence used to write pixels to both a +1 and −1 state in conjunction with two different row pulse sequences, B(t) and C(t). Here B(t) is the row pulse sequence needed to write a pixel into a +1 state and C(t) is the row pulse sequence needed to write a pixel into a −1 state. With these definitions, the following statements that the write pulse sequence is the difference of the column and row pulse sequences:

$$W+(t)=A(t)-B(t)$$

$$W-(t)=A(t)-C(t). \quad 3$$

These two equations represent a set of linear equations which, with the aid of some additional constraints and solving for the unknowns A(t) and B(t). Now if all of these pulse sequences consist of a succession of equal width rectangular pulses as have been all of those in the figures, then the zero average requirement can be translated into the following:

$$\Sigma W+(t)=\Sigma[A(t)-B(t)]=0$$

$$\Sigma W-(t)=\Sigma[A(t)-C(t)]=0. \quad 4$$

These two equations immediately yield another very fortuitous equation, namely:

$$\Sigma W^{+}(t) - \Sigma W^{-}(t) = \Sigma[A(t) - B(t)] - \Sigma[A(t) - C(t)] = 0 \quad (5)$$

$$\Sigma[A(t) - B(t) - A(t) + C(t)] = \Sigma[C(t) - B(t)] = 0$$

or $$\Sigma[C(t) - B(t)] = 0.$$

This last equation shows that if two pixels in the same column and adjacent rows need to be written into opposite states, then the average voltage between the two adjacent rows is zero. This is true in fact between any two rows. Thus, the requirement that the write pulse sequences have a zero average value automatically guarantees that the average voltage between any two rows to be zero.

Just as it was desirable for the write pulse sequences to satisfy the separation requirement described in Section B above, it is likewise desirable for the row and column pulse sequences to satisfy what will be called the "Same Sequence Requirement". This requires the row pulse sequence/s to be derived from the column pulse sequence by a simple translation in time. For example, if the column pulse sequence is defined by A(t), the write +1 row pulse sequence is defined by B(t), and the write −1 row pulse sequence is defined by C(t), then B(t) and C(t) must both be delayed/advanced versions of the same pulse sequence A(t). For convenience, let B(t) be a delayed version of A(t) delayed by an amount $\tau$ and let C(t) be an advanced version of A(t) (advanced by the same amount $\tau$. That is:

$$B(t)=A(t-\tau) \quad 6$$

$$C(t)=A(t+\tau).$$

The time $\tau$ that the row pulse seuqnces are advanced or delayed is parsimoniously defined to be the duration of the write pulse. Furthermore, the time scale is normalized by using the duration of the write pulse as a unit of time so that $\tau=1$. This yields normaly from Equation 6:

$$B(t)=A(t-1) \quad 7$$

$$C(t)=A(t+1).$$

With these conventions the equations, which must be solved in order to synthesize the row and column pulse sequences from given write pulse sequences are now considered. Before doing so, it should be pointed out that a 3-pulse sequence, such as the example shown in FIG. 3, cannot simultaneously satisfy both the separation requirement and the same sequence requirement. Therefore, a four-pulse sequence which satisfies both the separation and same sequence requirements is provided.

Figure 4:
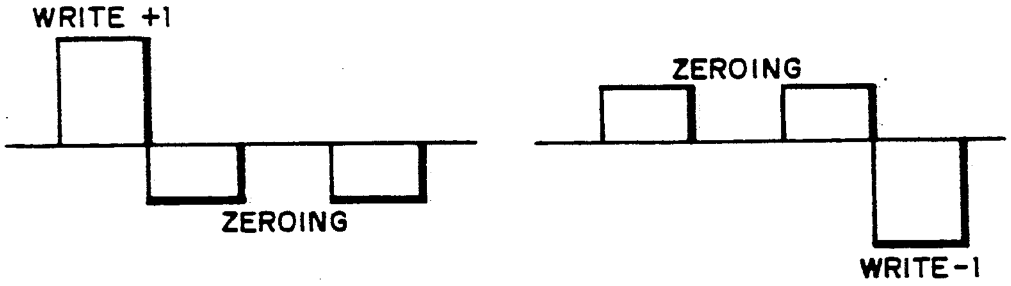
FIG. 4 shows a four-pulse write sequences which satisfy the separation requirement and same sequence requirements.

FIG. 4 shows the write pulse sequence which is four write pulses long and consists of four pulses, one of magnitude 1, two with magnitude 0.5 and one with magnitude 0.0. This particular pair of write pulse sequences is chosen because of the high degree of symmetry between the write +1 and the write −1 sequences. Clearly these sequences satisfy the zero average requirement and the separation requirement. If the sequence of voltage levels by W+j for the voltage of the $j^{th}$ pulse interval (each interval is one unit long) of the write +1 sequence and by W−j for the voltage of the $j^{th}$ pulse interval of the write −1 sequence, then it can be seen that:

$$\begin{aligned} W^{+}_{0} &= +1.0 & W^{-}_{0} &= +0.5 \\ W^{+}_{1} &= -0.5 & W^{-}_{1} &= 0.0 \\ W^{+}_{2} &= 0.0 & W^{-}_{2} &= +0.5 \\ W^{+}_{3} &= -0.5 & W^{-}_{3} &= -1.0 \end{aligned} \quad 8$$

With the help of Equation 3 above, this translates into:

$$\begin{aligned} A_0 - B_0 &= +1.0 & A_0 - C_0 &= +0.5 \\ A_1 - B_1 &= -0.5 & A_1 - C_1 &= 0.0 \\ A_2 - B_2 &= 0.0 & A_2 - C_2 &= +0.5 \\ A_3 - B_3 &= -0.5 & A_3 - C_3 &= -1.0. \end{aligned} \quad 9$$

This is now a set of 8 linear equations in 12 unknowns, and in order to solve this system uniquely it will be necessary to put further constraints (add more equations) on the unknowns. This same sequence requirement is reflected in Equations 7 which can be written as shown below:

$$\begin{aligned} B_0 &= A_3 & C_0 &= A_1 \\ B_1 &= A_0 & C_1 &= A_2 \\ B_2 &= A_1 & C_2 &= A_3 \\ B_3 &= A_2 & C_3 &= A_0 \end{aligned} \quad 10$$

Using these values for $B_j$ and $C_j$ and substituting them into Equation 9, the following two consistent sets of equations are obtained:

$$\begin{aligned} A_0 - A_3 &= +1.0 & A_0 - A_1 &= +0.5 \\ A_1 - A_0 &= -0.5 & A_1 - A_2 &= 0.0 \\ A_2 - A_1 &= 0.0 & A_2 - A_3 &= +0.5 \\ A_3 - A_2 &= -0.5 & A_3 - A_0 &= -1.0 \end{aligned} \quad (11)$$

The set of equations on the left and the set of equations on the right are the same set of equations (multiply one by −1 to get the other) and thus only four equations in four unknowns $A_0$, $A_1$, $A_2$, and $A_3$ are obtained. This system has a unique solution as shown below.

When dealing with unipolar voltages the $A_j$ must satisfy the following inequality:

$$0 \leq A_i \leq 1. \quad (12)$$

This inequality coupled with the first of Equations 11 on the left yields:

$$\{0 \leq A_0 \leq 1\} \;\&\; \{A_0 - A_3 = +1.0\} \rightarrow A_0 = +1.0, A_3 = 0.0 \quad (13)$$

Similarly, each of the additional equations in 11 yield in turn:

$$A_1 = +0.5, \quad (14)$$

$$A_2 = +0.5.$$

The column pulse sequence $A_j$ is now fully defined which will give the write pulse sequences shown in FIG. 4 when used in conjunction with the row and column pulse sequences $B_j$ and $C_j$ which are in related to $A_j$ through equations 10. Thus, the following sequences are obtained:

| Column Write +1 & −1 | Row Write +1 | Row Write −1 |
|---|---|---|
| $A_0 = +1.0$ | $B_0 = 0.0$ | $C_0 = +0.5$ |
| $A_1 = +0.5$ | $B_1 = +1.0$ | $C_1 = +0.5$ |
| $A_2 = +0.5$ | $B_2 = +0.5$ | $C_2 = 0.0$ |
| $A_3 = 0.0$ | $B_3 = +0.5$ | $C_3 = +1.0.$ |

Figure 5:
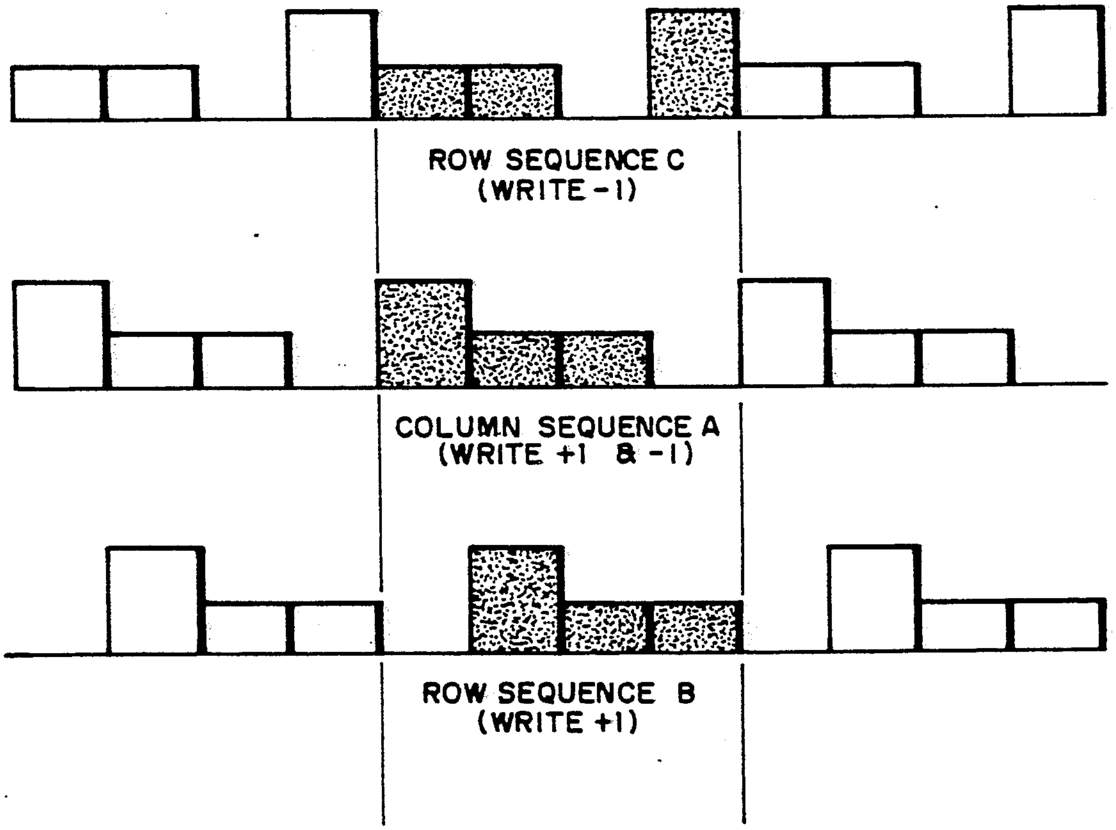
FIG. 5 shows row and column sequences as delayed and advanced versions of periodic wavetrains.

These pulse sequences are shown in FIG. 5 as periodic wavetrains in an effort to make clear the relative displacement in time of the row pulse sequences relative to the column pulse sequence.

Figure 6:
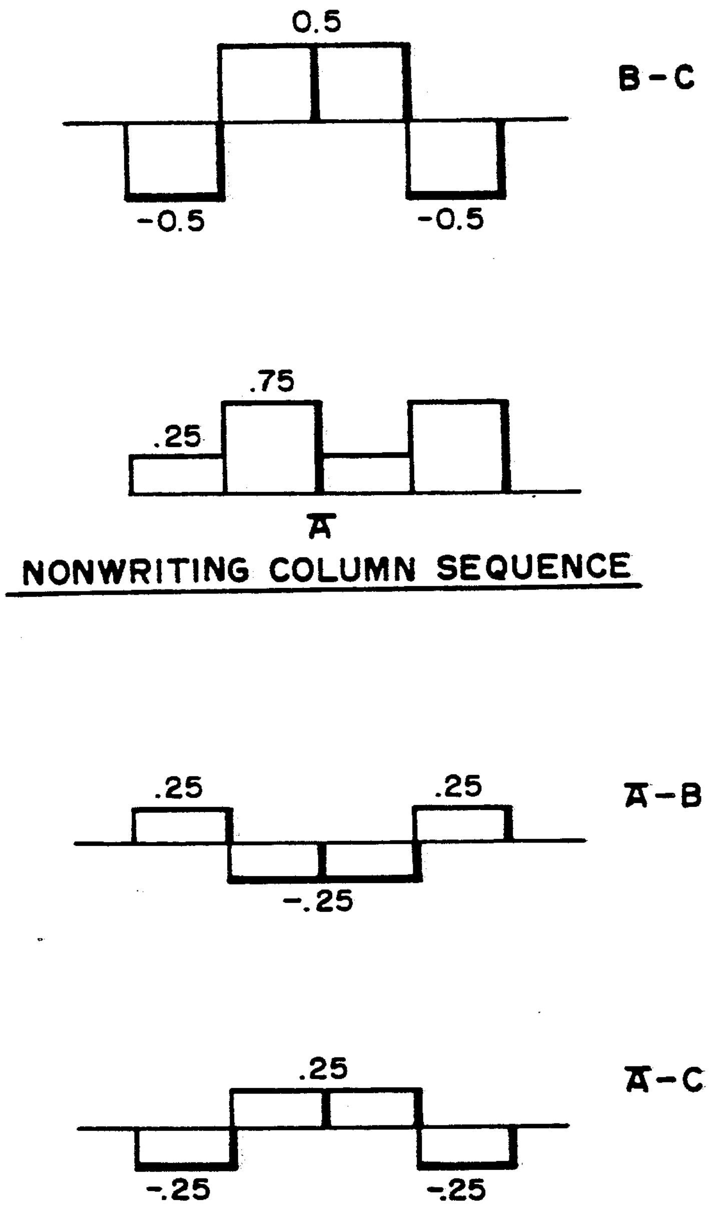
FIG. 6 shows the column and row sequences to produce a write +1 sequence and a write −1 pulse sequence.

FIG. 6 shows the relationship between these row and column pulse sequences and the write pulse sequences they generate.

One last question remains to be addressed, and that is what voltage waveform, if any, should be put on columns which are *not* being written. Clearly, this voltage waveform must not interact strongly enough with the row pulse sequences to cause a pixel to change state and, in addition, it must result in a zero average voltage on those pixels not being written. It turns out that it is quite a simple matter to construct a non-writing column pulse sequence out of the row pulse sequences. As seen in Equation 5, the difference of the row pulse sequences B and C averages to zero over the period of the write pulse sequence and so either of these could be applied to the non-written columns as long as the difference B-C is never large enough to exceed the voltage×time threshold of the pixel.

Figure 7:
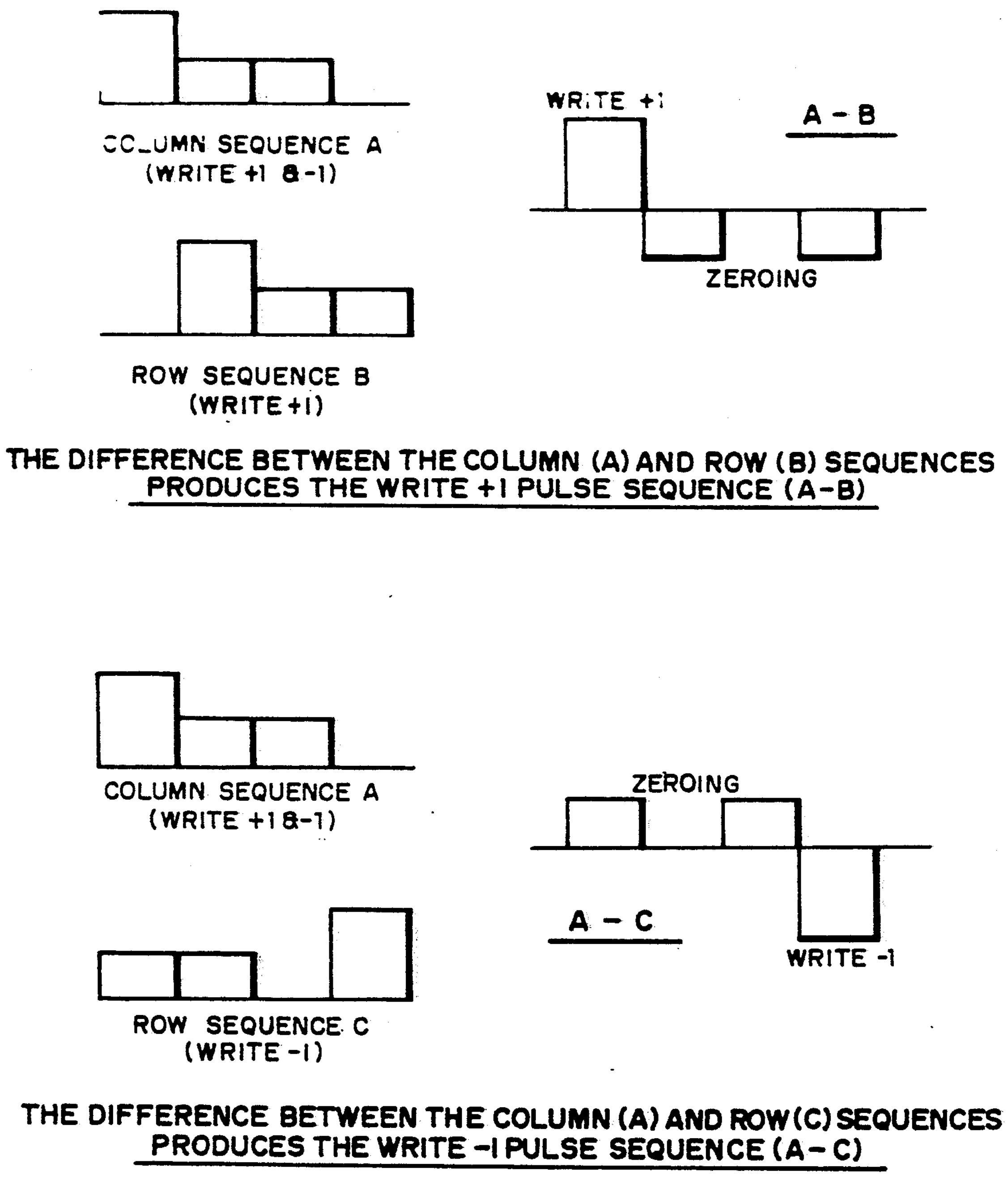
FIG. 7 shows non-writing column pulse sequences.

FIG. 7 shows the character of the B-C pulse sequence and it can be seen that, in the middle of this sequence, there are two pulses back to back and this could exceed the voltage×time threshold.

A nice solution is to use an equally weighted average of the row pulse sequences as the non-writing column pulse sequence $\overline{A}$:

$$A_i = (B_i + C_i)/2.$$

It can be seen that this will result in a voltage waveform across a pixel which never exceeds ¼ and whose voltage×time product never exceeds ½. This waveform and its differences with the row pulse sequences B and C are shown in FIG. 7.

Figure 8:
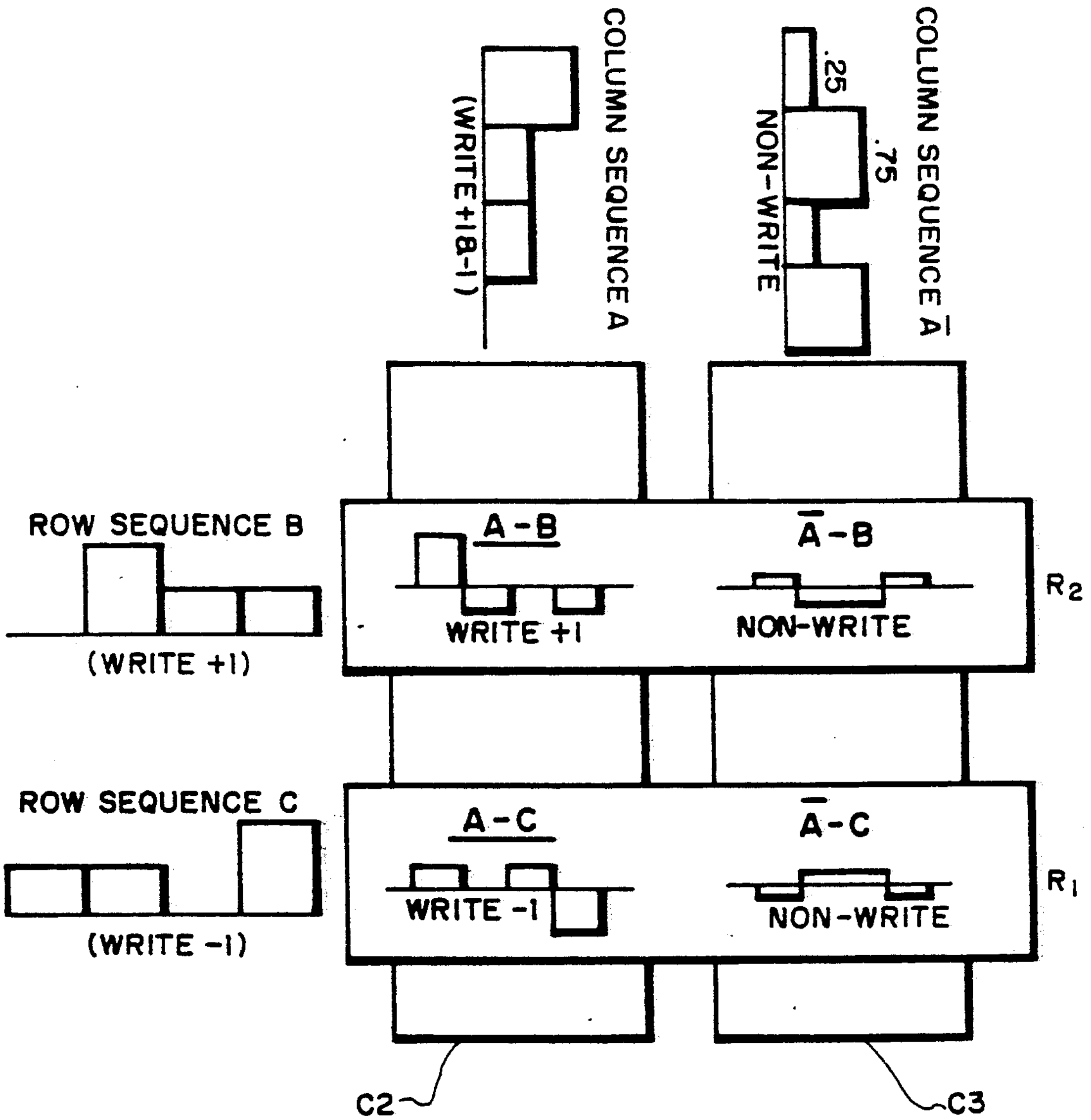
FIG. 8 shows the array with the write and non-write pulse sequences applied.

Using the waveforms of FIGS. 6 and 7, FIG. 8 shows the addressing of a portion of an array.

Figure 9:
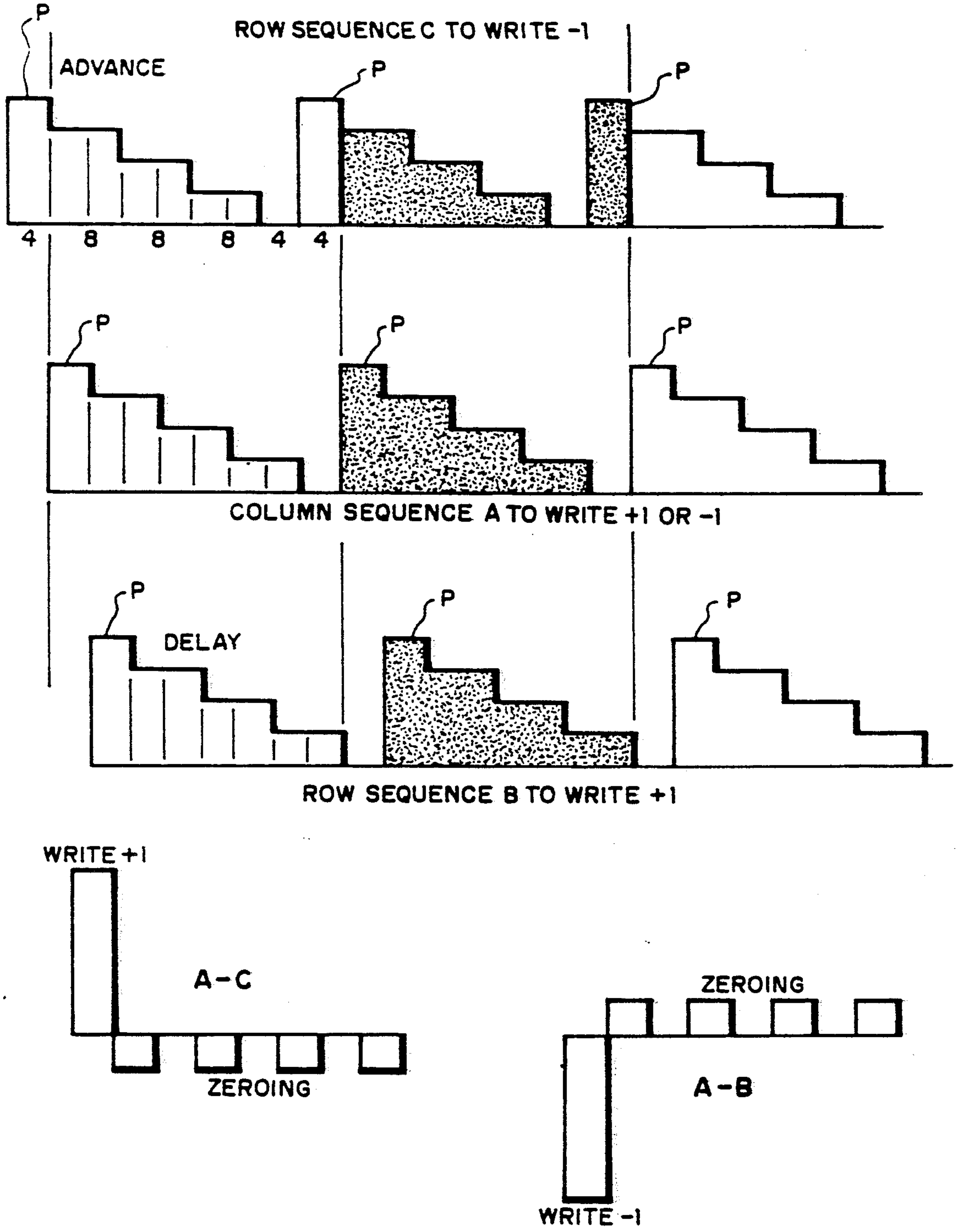
FIG. 9 shows row and column pulse sequences of the five pulse write type with delayed and advanced versions thereof, and the zeroing pulses for the pulse sequences.

FIG. 9 shows row and column sequence pulses similar to that shown in FIG. 5 except that the pulse sequence comprises five pulses. The column sequence A shows five pulses—a threshold pulse P of unit voltage and width, a first sub-threshold pulse of a 0.75 voltage and twice the width of the threshold pulse, a second sub-threshold pulse of 0.5 voltage and twice the width of the threshold pulse, a third sub-threshold pulse of 0.25 voltage and finally a zero pulse of the width of the threshold voltage. It is to be noted that the row sequence C has its threshold pulse in the prior time unit since it is a advanced pulse sequence as compared to the column sequence A and the zero pulse of row sequence B appears before the threshold pulse in the same time period since it is a delayed sequence. Providing the threshold pulse and the zero pulse with the same width gives the pulse sequences their symmetry.

Actually the double widths of the sub-threshold pulses of FIG. 9 equal eight pulse units which correspond to the eight pulse unit for the zeroing pulses A–C and A–B in FIG. 9. These zeroing pulses are similar to the zeroing pulses of FIG. 7 and perform the same function.

It is to be understood that, while the above description refers to column sequence pulses and row sequence pulses, the identity of column and row pulses was simply to describe the array but the pulses may be reversed such that what was described as column sequence pulses can be row sequence pulses and visa versa.

It is also to be understood that while two embodiments of pulse sequences are shown, other embodiments will occur to those skilled in the art after having studied the foregoing Drawings and Specification and these other embodiments are intended to be within the scope of this invention.

I claim:

1. In a ferroelectric liquid crystal array with rows and columns of electrodes and a power supply to address each column and row so that an electric field is applied at the intersection of selected intersections of the rows and columns, a method for changing the state of the ferroelectric liquid crystal at said intersection comprising the steps of, applying pulses as a column write pulse sequence to a selected column within a selected time unit which sequence will change the state in either of two directions, applying the same sequence of pulses to a selected row within the same time unit, said pulses of said same sequence being advanced or delayed so that the voltage difference between the column write pulses and the same sequence pulses to determine the direction of said change and thus write a +1 or a −1 pixel at said selected intersection.

2. The method as claimed in claim 1 wherein the pulses of said column write sequence comprise one threshold pulse, two sub-threshold pulses, and one zero pulse all of equal width.

3. The method as claimed in claim 2 wherein selected sub-threshold pulse sequences are applied to other selected intersections as non-write sequences.

4. The method as claimed in claim 1 wherein the pulses of said column write sequence comprise one threshold pulse and one zero pulse of equal width and more than two sub-threshold pulses, each having equal widths but of a different voltage level.

5. The method as claimed in claim 4 wherein selected sub-threshold pulse sequences are applied to other selected intersections as non-write sequences.

6. A ferroelectric array comprising rows and columns of electrodes to form pixels at the intersections of the rows and columns, means for applying a pulse sequence to a selected column, means for applying a pulse sequence to selected rows, the pulse sequence applied to said rows being the same as the pulse sequence applied to said column but advanced or delayed so that the voltage difference between the columns and rows determine the direction of the pixels and thus write a +1 or a −1 at said pixels.

7. The ferroelectric array as claimed in claim 6 further including means for applying non-write sequences at other selected rows and columns.

8. A ferroelectric liquid crystal device comprising, a quantity of ferroelectric liquid crystal sandwiched between a pair of parallel plates, a plurality of first electrodes disposed on one side of said liquid crystal parallel to said plates, a plurality of second electrodes disposed on the other side of said liquid crystal parallel to said plates and transverse to said first electrodes, means for selectively applying voltage pulses across any of said first electrodes and any of said second electrodes for creating an electric field in any of a plurality of portions of said liquid crystal, said voltage pulses applied to said first electrodes comprising a sequence of pulses within a selected time unit which sequence will change the state of said liquid crystal in either of two directions, applying the same sequence of pulses to said second electrodes within the same time unit, said pulses of said same sequence being advanced or delayed so that the voltage difference between the first and second electrodes determines the direction of said change of state and thus write a +1 or a −1 at selected portions of said liquid crystal.

9. The device as claimed in claim 8 wherein the pulses applied to either of said selected electrodes comprises one threshold pulse, two sub-threshold pulses and one zero pulse, all of equal width.

10. The device as claimed in claim 8 wherein the pulses applied to either of said selected electrodes comprises one threshold pulse and one zero pulse of equal width and more than two sub-threshold pulses, each having equal widths but of different voltage levels.

* * * * *